United States Patent Office 2,763,684
Patented Sept. 18, 1956

2,763,684

HYDRAZIDES OF DIHYDROXYBENZOIC ACIDS

Floyd L. Beman, Midland, Mich., assignor to The Dow Chemical Company, Midland, Mich., a corporation of Delaware No Drawing. Application July 9, 1953,
Serial No. 367,089

4 Claims. (Cl. 260—559)

This invention is concerned with the hydrazides of the dihydroxybenzoic acids and the acid addition salts of such compounds. The hydrazides of the present invention are characterized by the following formula

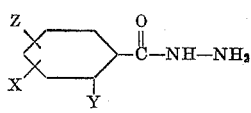

In this and succeeding formulae X represents a member of the group consisting of hydrogen and methyl, Y represents hydroxyl, and Z represents hydroxyl which is meta to the carbonyl group and is para to Y when X is methyl and meta to Y. These compounds are crystalline solids which are somewhat soluble in many organic solvents and of low solubility in water. The acid addition salts are crystalline solids which are readily soluble in many common organic solvents and water.

The new hydrazide compounds may be prepared by reacting hydrazine hydrate ($N_2H_4 \cdot H_2O$) with a lower alkanol ester of a substituted dihydroxy benzoic acid having the formula

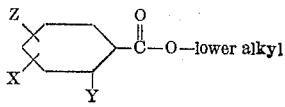

The reaction may be carried out in an organic solvent or water as reaction medium and takes place smoothly at temperatures not in excess of about 60° C. The reaction may be carried out when employing substantially equimolecular proportions of the reagents. However, it is generally preferred to employ an excess of the hydrazine hydrate reactant. Upon completion of the reaction, the reaction mixture is neutralized to a pH of approximately 7 with a mineral acid such as hydrochloric acid, the desired product precipitating as a crystalline material. The product may be separated by filtration and washed with water to remove traces of unreacted hydrazine reagent. If desired, the product may be further purified by recrystallization from suitable organic solvents.

The acid addition salts of the new hydrazides such as the hydrochlorides, hydrobromides, acetates, sulfates, benzoates, tartrates, succinates and other addition salts may be prepared by allowing the hydrazide to react with the desired acid in a solvent such as diethyl ether. Upon evaporation of the solvent, the salt is obtained as a crystalline residue. The latter may be further purified by recrystallization from suitable organic solvents.

Representative hydrazides, which among others, are within the scope of the present invention include 6-methyl-2,5-dihydroxybenzoic acid hydrazide, 2,3-dihydroxybenzoic acid hydrazide, 4-methyl-2,5-dihydroxybenzoic acid hydrazide, 3-methyl-2,5-dihydroxybenzoic acid hydrazide and 5-methyl-2,3-dihydroxybenzoic acid hydrazide.

The following examples are given to illustrate one manner which may be used to prepare the compounds of the invention but are not to be construed as limiting:

Example 1.—2,5-dihydroxybenzoic acid hydrazide 84 grams (0.5 mole) of methyl 2,5-dihydroxybenzoate was added portionwise with stirring and cooling to 147 grams (2.5 moles) of aqueous 85 percent hydrazine hydrate (equivalent to 2.5 moles of $N_2H_4 \cdot H_2O$). The addition was carried out over a period of 7 minutes and at a temperature of about 30° C. About 4.5 hours after the addition, the reaction mixture was diluted with 250 milliliters of water and the resulting mixture neutralized with concentrated hydrochloric acid to a pH of approximately 7. During the neutralization, a 2,5-dihydroxybenzoic acid hydrazide product precipitated as a crystalline solid. The latter product was separated by filtration and dried. The dried product had a melting point of 214°–215° C.

Example 2.—5-methyl-2,3-dihydroxybenzoic acid hydrazide 0.5 mole of ethyl 5-methyl-2,3-dihydroxybenzoate, 2.5 moles of hydrazine hydrate and 200 milliliters of methanol are mixed together with stirring and at a temperature somewhat below 35° C. In order to control the temperature, the latter operation is carried out with cooling. Stirring is then continued for about 4 hours and the reaction mixture set aside overnight. The mixture is then neutralized with concentrated hydrochloric acid, a 5-methyl-2,3-dihydroxybenzoic acid hydrazide product precipitating as a crystalline solid. The latter product may be separated from the reaction mixture by filtration.

Example 3.—3-methyl-2,5-dihydroxybenzoic acid hydrazide 50 grams (0.275 mole) of methyl 3-methyl-2,5-dihydroxybenzoate and 81 grams of aqueous 85 percent hydrazine hydrate (equivalent to 1.375 moles of $N_2H_4 \cdot H_2O$) were mixed together with stirring and cooling and at a temperature somewhat below 30° C. During the mixing operation, the reaction mixture solidified and 250 milliliters of water was added thereto to the effect solution. Stirring was then continued for 2 hours and the mixture thereafter set aside overnight. During this period, a product precipitated in the reaction mixture as a crystalline solid. The reaction mixture was then neutralized with concentrated hydrochloric acid and thereafter filtered to separate a 3-methyl-2,5-dihydroxybenzoic acid hydrazide product as a crystalline residue. The latter was washed with water and dried and found to melt at 213°–214° C.

Example 4.—4-methyl-2,5-dihydroxybenzoic acid hydrazide 0.3 mole of normal butyl 4-methyl-2,5-dihydroxybenzoate, 2 moles of hydrazine hydrate and 200 milliliters of isopropanol are mixed together with stirring and cooling and at a temperature somewhat below 40° C. Stirring is then continued for a period of about 3 hours and the reaction mixture thereafter diluted with 250 milliliters of water. The mixture is then neutralized with concentrated hydrochloric acid. During the neutralization, a 4-methyl-2,5-dihydroxybenzoic acid hydrazide product precipitates as a crystalline solid and is separated by filtration.

Example 5.—2,5-dihydroxybenzoic acid hydrazide hydrochloride 0.25 gram of the 2,5-dihydroxybenzoic acid hydrazide product of Example 1 was dissolved in a mixture containing 50 milliliters of benzene and 100 milliliters of diethyl ether and the resulting mixture filtered at a temperature of 34° C. Gaseous hydrogen chloride was then bubbled into the filtrate over a period of about 7 minutes, a 2,5-dihydroxybenzoic acid hydrazide hydrochloride product precipitating as a crystalline solid during the hydrogen chloride addition. The latter product was separated by filtration, washed with diethyl ether at room temperature and dried. The dried product had a melting point of 235–236° C.

The new compounds of the invention are valuable as intermediates for the preparation of more complex organic derivatives and as active toxic constituents of parasiticide compositions. Representative members of the new compounds have been found to be of particular value as active toxic constituents of germicide and disinfectant compositions for the control of *Salmonella typhosa* and *Staphylococcus aureus*.

The lower alkanol esters of the dihydroxybenzoic acids employed as starting materials, as previously described, may be prepared by reacting a suitable dihydroxybenzoic acid or methyl substituted dihydroxybenzoic acid with a lower alkanol in the presence of an esterifying agent such as sulfuric acid. The reaction takes place smoothly at temperatures in excess of about 45° C. The desired esters are crystalline solids and may be separated in conventional fashion, e. g. washing with water, washing with dilute aqueous sodium carbonate and recrystallization from various organic solvents.

The methyl substituted dihydroxybenzoic acids as above employed may be prepared by hydrolyzing a suitable halogenated methyl substituted 2-hydroxybenzoic acid. The hydrolysis is carried out in an aqueous alkaline medium and preferably in an aqueous alkaline solution of a metal hydroxide. The reaction takes place smoothly at temperatures of from 50° to 180° C. Upon completion of the hydrolysis, the reaction mixture is acidified with a mineral acid, the desired methyl substituted dihydroxy benzoic acid product precipitating as a crystalline solid. The latter may be separated by filtration and further purified by recrystallization from suitable organic solvents.

The halogenated methyl-2-hydroxybenzoic acids, as above employed, may be prepared by halogenating a suitable methyl-2-hydroxybenzoic acid in glacial acetic acid as reaction medium. The halogenation takes place smoothly at temperatures of from 40° to 115° C. In carrying out the reaction, bromine, chlorine or iodine chloride is contacted portionwise with the methyl-2-hydroxybenzoic acid dissolved in acetic acid and under conditions of elevated temperature in the reaction vessel. Upon completion of the reaction, the reaction mixture may be diluted with water to precipitate the halogented methyl-2-hydroxybenzoic acid product as a crystalline solid. The latter may be separated by filtration and purified by recrystallization from various organic solvents.

I claim:

1. A compound selected from the group consisting of (*a*) the hydrazides of 2,3-dihydroxybenzoic acid, 2,5-dihydroxybenzoic acid, 3-methyl-2,5-dihydroxybenzoic acid, 4-methyl-2,5-dihydroxybenzoic acid, 5-methyl-2,3-dihydroxybenzoic acid and 6-methyl-2,5-dihydroxybenzoic acid, and (*b*) the acid addition salts of said hydrazides.

2. 2,5-dihydroxybenzoic acid hydrazide.

3. 3-methyl-2,5-dihydroxybenzoic acid hydrazide.

4. 2,5-dihydroxybenzoic acid hydrazide hydrochloride.

References Cited in the file of this patent

Fox et al.: "J. Org. Chem.," vol. 17, December 1952 (rec'd July 16, 1952), pp. 1656–58.

Mentzer et al.: "Bull. Soc. Chim. France," 1950, pp. 782–86.

Camber et al.: "J. Am. Chem. Soc.," vol 73 (1951), p. 4021.

Yale et al.: "J. Am. Chem. Soc.," vol. 75, April 20, 1953 (rec'd October 29, 1952), pp. 1933–42.